United States Patent
Eakins et al.

(10) Patent No.: US 10,821,847 B2
(45) Date of Patent: Nov. 3, 2020

(54) SYSTEMS AND METHODS FOR UNDERSIDE CHARGING OF ELECTRICAL VEHICLES

(71) Applicant: ABB Schweiz AG, Baden (CH)

(72) Inventors: William J. Eakins, Coventry, CT (US); Gregory A. Cole, West Hartford, CT (US); Sangeun Choi, Simsbury, CT (US); Thomas A. Fuhlbrigge, Ellington, CT (US)

(73) Assignee: ABB Schweiz AG, Baden (CH)

( * ) Notice: Subject to any disclaimer, the term of this patent is extended or adjusted under 35 U.S.C. 154(b) by 72 days.

(21) Appl. No.: 16/182,033

(22) Filed: Nov. 6, 2018

(65) Prior Publication Data

US 2020/0139830 A1 May 7, 2020

(51) Int. Cl.
*B60L 53/16* (2019.01)
*B60L 53/35* (2019.01)
*H01R 13/62* (2006.01)
*H02J 7/00* (2006.01)
*B62D 25/20* (2006.01)

(52) U.S. Cl.
CPC ............... *B60L 53/16* (2019.02); *B60L 53/35* (2019.02); *H01R 13/62* (2013.01); *H02J 7/0027* (2013.01); *H02J 7/0045* (2013.01); *B62D 25/20* (2013.01); *H01R 2201/26* (2013.01)

(58) Field of Classification Search
CPC ......... B60L 53/16; B60L 53/35; H01R 13/62; H01R 2201/26; H02J 7/0027; H02J 7/0045; B62D 25/20
USPC ......................................................... 320/109
See application file for complete search history.

(56) References Cited

U.S. PATENT DOCUMENTS

| | | | |
|---|---|---|---|
| 10,017,062 B2 * | 7/2018 | Kufner | B60L 53/30 |
| 10,518,658 B1 * | 12/2019 | Eakins | H01R 43/26 |
| 2013/0033227 A1 * | 2/2013 | Gibbons, Jr. | B60L 11/1829 320/108 |
| 2013/0076902 A1 | 3/2013 | Gao et al. | |

(Continued)

FOREIGN PATENT DOCUMENTS

| | | |
|---|---|---|
| DE | 102016008982 A1 | 2/2017 |
| DE | 102017007818 A1 | 1/2018 |
| WO | WO 2016/119000 A1 | 8/2016 |

OTHER PUBLICATIONS

European Patent Office, International Search Report in International Patent Application No. PCT/IB2019/059512, 5 pp. (dated Apr. 6, 2020).

(Continued)

*Primary Examiner* — M Baye Diao
(74) *Attorney, Agent, or Firm* — Leydig, Voit & Mayer, Ltd.

(57) ABSTRACT

Devices, systems, and methods for charging an electric vehicle are disclosed. The system includes a floor unit and a vehicle unit, each having an electrical connector. The method includes positioning the floor unit electrical connector with reference to the mating vehicle unit electrical connector. The method includes inserting the floor unit electrical connector into the mating vehicle unit electrical connector. The method includes initiating an electric vehicle charging process by selectively enabling a flow of electric current from an electric power supply through the matingly coupled vehicle unit and floor unit electrical connectors.

19 Claims, 13 Drawing Sheets

(56) References Cited

U.S. PATENT DOCUMENTS

2014/0333261 A1* 11/2014 Oh .................... B60L 53/35
                                              320/109
2016/0332525 A1   11/2016 Kufner et al.
2018/0001777 A1   1/2018  Kilic

OTHER PUBLICATIONS

European Patent Office, Written Opinion in International Patent Application No. PCT/IB2019/059512, 13 pp. (dated Apr. 6, 2020).

* cited by examiner

SYSTEMS AND METHODS FOR UNDERSIDE CHARGING OF ELECTRICAL VEHICLES

TECHNICAL FIELD

The present disclosure relates to charging systems and methods for electric vehicles and, more particularly, to systems and methods for effecting an electrical connection between a vehicle charger and the vehicle.

BACKGROUND

Use of electrical vehicles is becoming increasingly popular due to the environmental benefits of removing pollution caused by fossil fuel burning vehicle engines from the environment, especially in densely populated urban environments. As with most mobile electrical devices, electrical vehicles carry electrical power storage devices or batteries, which provide power to the vehicle propulsion and other systems. As can be appreciated, the vehicle batteries require periodic recharging to provide consistent vehicle operation.

At present, electric vehicle recharging is a time consuming process that is typically carried out over long periods, for example, overnight or during prolonged periods when the electric vehicle is parked. Power dispensers include flexible conduits or wire bundles that include a connector at their end, which plugs into a vehicle receptacle and then begins the transfer of power from the dispenser the vehicle's battery.

Traditional vehicle power dispensers operate at around 200-240 Volt AC, and transfer about 30 Amp of electrical power into a vehicle. As a consequence, providing a full charge to a vehicle can take up to 10 hours or more. With the increase in popularity of electric vehicles, faster charging solutions which are easier and safer to operate, and which can be retrofitted into existing fully electric or hybrid electric vehicles and facilities are required.

SUMMARY OF THE DISCLOSURE

In one aspect, the disclosure describes a floor unit device for charging of an electric vehicle (EV). The floor unit device includes a frame. The floor unit includes a first pivot and a second pivot positioned in the frame, where the first pivot is positioned in the frame proximally from the second pivot. The floor unit includes a linear slide slidingly engaged with the frame and disposed in the frame distally from the second pivot. The floor unit includes a tri-pivot knuckle having a distal link extending therefrom and having three pivot joints rotatably coupled thereto, where a first of the three pivot joints is coupled to the linear slide. The floor unit includes an actuating link coupled between the first pivot and a second of the three pivot joints. The actuating link includes an actuator configured to alternately move the actuating link generally distally and generally proximally. The floor unit includes a proximal link coupled to the second pivot and a third of the three pivot joints. The proximal link includes a compliance unit configured to exert a generally distally-directed force upon the proximal link. The floor unit includes a floor unit electrical connector coupled to a distal end of the distal link.

In another aspect, the disclosure describes a system for charging of an EV in an EV charging environment having a ground surface. The EV has an EV underside positioned opposite the ground surface. The system includes a floor unit device positioned on or at least partially in the ground surface. The floor unit device includes a floor unit electrical connector. The system includes a vehicle unit device positioned on or at least partially in the EV underside. The vehicle unit device includes a frame. The vehicle unit includes a door slidingly engaged with at least a portion of the frame, where the frame has an opening in at least one side thereof, and where the door is configured to at least partially selectively cover the opening to thereby at least partially enclose the frame under action of a door actuator. The vehicle unit includes a charge receptacle positioned in the frame within a charge cavity defined in the frame. The vehicle unit includes a vehicle unit electrical connector positioned in the charge cavity.

In yet another aspect, the disclosure describes a method for charging of an EV. The method includes positioning a floor unit electrical connector with reference to the mating vehicle unit electrical connector. The method includes inserting the floor unit electrical connector into the mating vehicle unit electrical connector. The method includes initiating an EV charging process by selectively enabling a flow of electric current from an electric power supply through the matingly coupled vehicle unit and floor unit electrical connectors.

Further and alternative aspects and features of the disclosed principles will be appreciated from the following detailed description and the accompanying drawings. As will be appreciated, the principles related to devices, systems, and methods for charging of EVs disclosed herein are capable of being carried out in other and different embodiments, and capable of being modified in various respects. Accordingly, it is to be understood that both the foregoing general description and the following detailed description are exemplary and explanatory only and do not restrict the scope of the appended claims.

DETAILED DESCRIPTION

Reference will now be made in detail to specific embodiments or features, examples of which are illustrated in the accompanying drawings. Wherever possible, corresponding or similar reference numbers will be used throughout the drawings to refer to the same or corresponding parts. Moreover, references to various elements described herein, are made collectively or individually when there may be more than one element of the same type. However, such references are merely exemplary in nature. It may be noted that any reference to elements in the singular may also be construed to relate to the plural and vice-versa without limiting the scope of the disclosure to the exact number or type of such elements unless set forth explicitly in the appended claims.

Figure 1A:
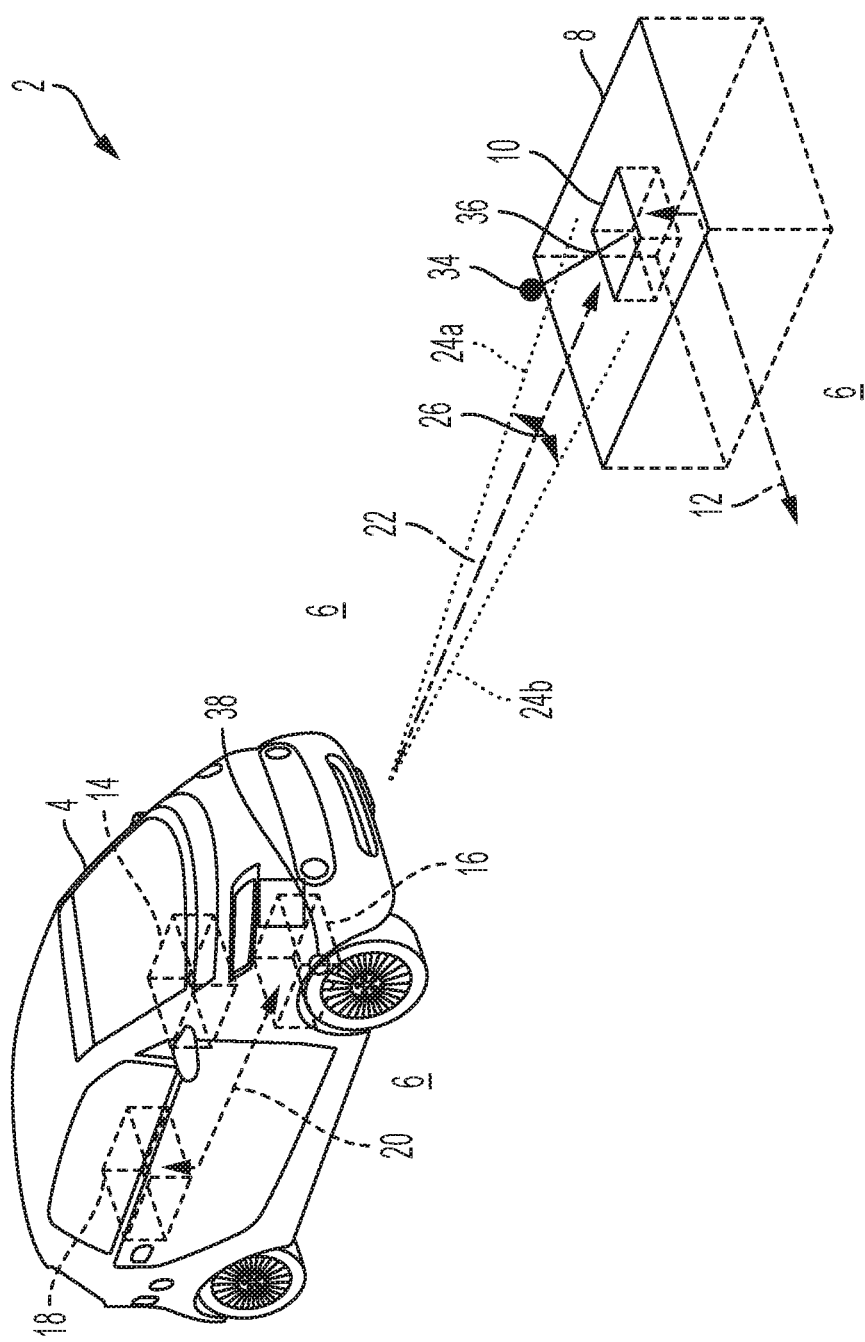
FIGS. 1A-1D are schematic views is a perspective view of an electric vehicle (EV) charging environment according to an embodiment of the disclosure.

FIG. 1A is a perspective view of an electric vehicle (EV) charging environment 2 according to an embodiment of the disclosure. In the example shown in FIG. 1A, an EV 4 is positioned on a ground surface 6. EV 4 is a car, as shown in FIG. 1A. Alternatively, EV4 may be a truck, a motorcycle, a moped, a truck or bus, a scooter, a farm implement or any other on- or off-highway vehicle. In the example shown, ground surface 6 is a floor of a garage or other vehicle storage facility of a home or business. Alternatively, ground surface 6 may be a surface of a parking lot. Environment 2 includes a floor unit 8. Floor unit 8 is positioned on or, at least in part, beneath ground surface 6. Depending on application, and also on the ground clearance of the vehicle, the floor unit 8 may be fully or partially disposed beneath the ground surface, or may alternatively be disposed on the ground surface, for example, when installed on existing floors. Floor unit 8 includes a connector unit 10. At least a portion of connector unit 10 faces and is exposed or exposable to ground surface 6. Connector unit 10 of floor unit 8 is operatively coupled to or associated with an electric power source (e.g., a utility grid, not shown in FIG. 1A), either directly or through a transforming, conditioning, and/or conversion device such as a transformer. A first electric power flow 12 can thus be selectively enabled between power source and floor unit 8, including to connector unit 10.

EV 4 includes a drivetrain 14 providing motive power to the EV 4 for driving. EV 4 includes a vehicle unit 16 and at least one power storage device such as a battery 18. Battery 18 is operatively coupled to drivetrain 14 for providing electric power thereto to enable providing motive power for EV 4 selectively during operation. Structures and systems of the EV 4 that accomplish the provision of power to the drivetrain 14 selectively by an operator (not shown) of the EV 4 are omitted for simplicity. At least a portion of vehicle unit 16 faces and is exposed or exposable to ground surface 6. It is noted that, while the EV 4 is shown in one orientation as it approaches the floor unit 8, any orientation of approach is also contemplated. Vehicle unit 16 is operatively coupled to battery 18 to provide an interface for providing electrical power to charge the battery 18. A second electric power flow 20 is thus enabled between vehicle unit 16 and battery 18.

In the EV charging environment 2 shown in FIG. 1A, EV 4 is being driven and approaches the floor unit 8 including connector unit 10. A driver of EV 4 (e.g., a human driver and/or an autonomous vehicle driving system, not shown in FIG. 1A) steers or otherwise controls the EV 4 to approach floor unit 8 including connector unit 10 along a centerline path 22. As shown in FIG. 1A, centerline path 22 extends from EV 4 to at least approximately a center point of connector unit 10 proximal ground surface 6. Based on the particular dimensions and other specifications of EV 4, floor unit 8 including connector unit 10, and/or vehicle unit 16, an approach path of EV 4 to floor unit 8 including connector unit 10 may deviate from the target centerline path 22 by an allowable deviation 24. The allowable deviation may be in any direction, including but not limited to a horizontal or vertical direction. Allowable deviation 24 includes a driver side deviation 24a and a passenger side deviation 24b. An allowable deviation angle 26 is defined between lines defining driver side deviation 24a and passenger side deviation 24b. In three dimensions, the deviation angle 26 may form a conical area that accounts for height of ground clearance of the vehicle, as well pitch, yaw and roll of the vehicle's trajectory during the approach to the floor unit 8, and also during the connection and charging operations.

Figure 2:
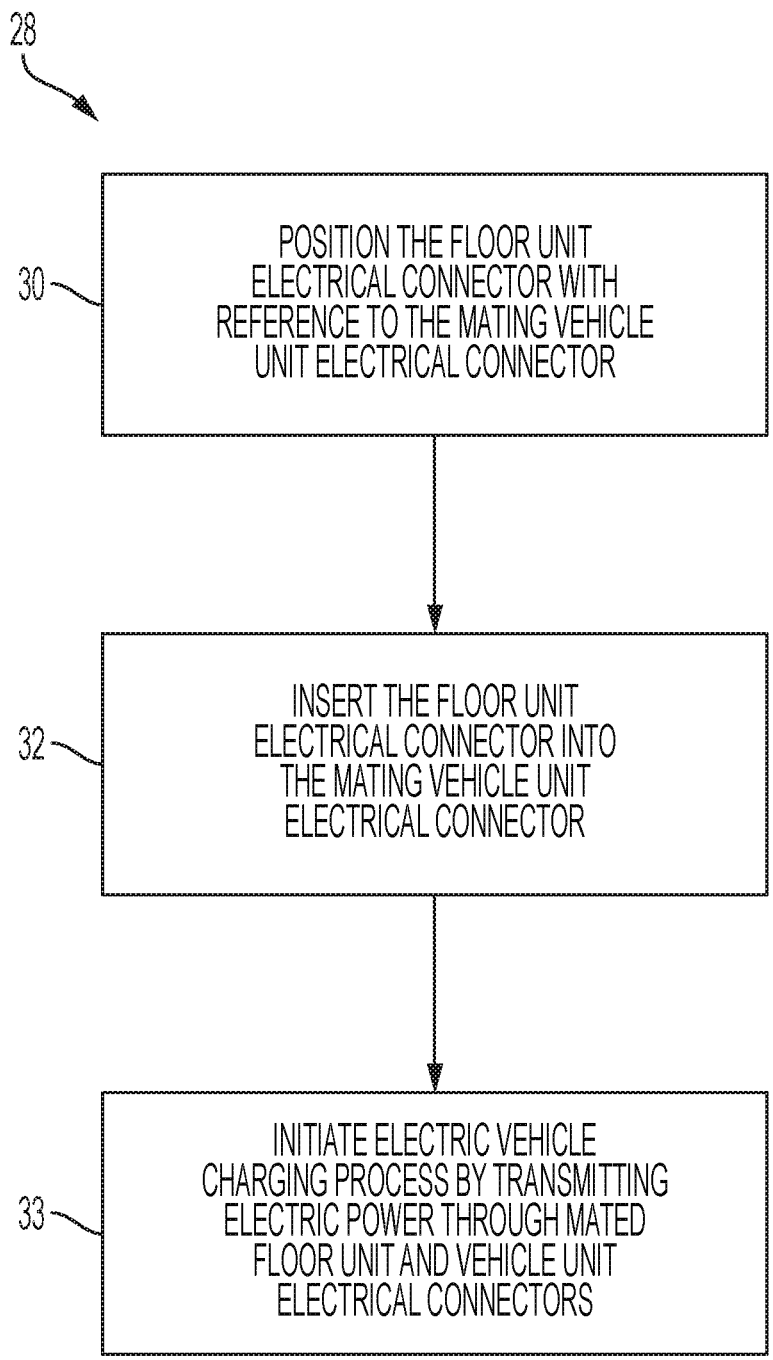
FIG. 2 is a flowchart of a method for underside charging of EVs according to an embodiment of the disclosure.

FIG. 2 is flowchart of a method 28 for underside charging of the EV 4 according to an embodiment of the disclosure. In an example, method 28 is implemented and performed, at least in part, by a mechanical linkage system 36, which rises up from the floor 6 from the connector unit 10 and includes a floor unit electrical connector 34 (as shown in FIG. 1A). The floor unit electrical connector 34 matingly engages a vehicle unit electrical connector 38 associated with the vehicle unit 16 when the EV 4 is stationary over the floor unit 8 for charging.

Referring to FIG. 2, method 2 includes positioning at 30 the floor unit electrical connector 34 on the floor unit 8 with reference to the mating vehicle unit electrical connector 38 on the EV 4 using linkage 36. Such positioning and/or placement may be carried out automatically. Method 28 further includes inserting at 32 the floor unit electrical connector 34 into vehicle unit electrical connector 38, and initiating an EV 4 charging process at 33 (e.g., after the inserting step is performed at 32). Alternatively, the vehicle unit electrical connector 38 is inserted at 32 into floor unit electrical connector 34. When floor unit 34 and vehicle unit 38 electrical connectors are mated and the charging process is initiated at 33, a flow of electrical current is allowed to be transmitted from the floor unit 8 to the vehicle unit 16, and from there to the battery 18 to charge the battery 18. An electrical connection between the connectors 34 and 38 is included in this power flow path that charges the battery 18. As can be appreciated, the environment in which the connectors 34 and 38 is harsh because one or both sides of the connectors 34 and 38 are exposed to the environment, road debris, etc. Moreover, the connectors 34 and 38 are advantageously compact to enable or facilitate manual and/or automatic coupling for charging the battery 18.

Figure 3:
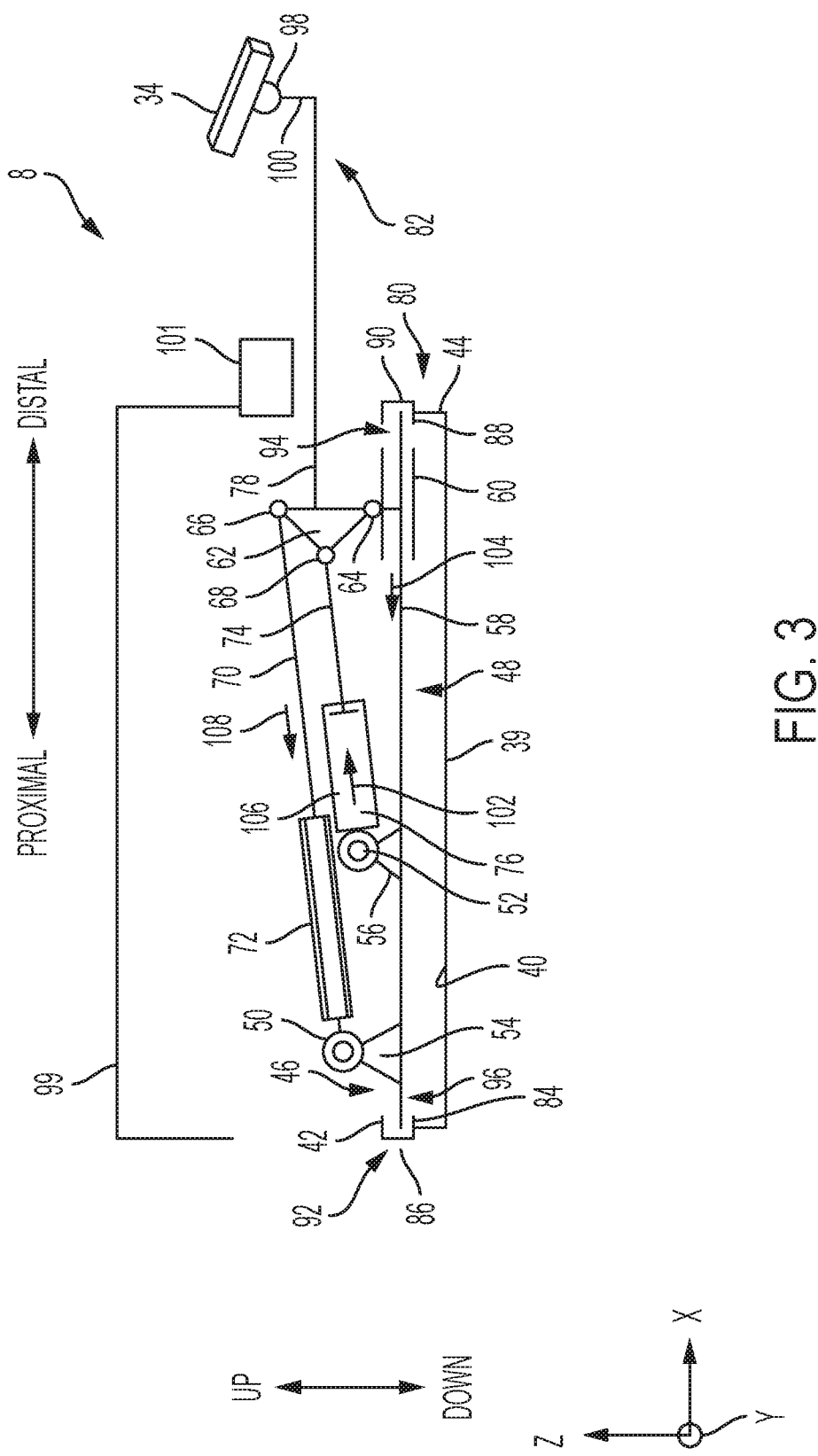
FIG. 3 is a schematic diagram of a floor unit for underside charging of EVs according to an embodiment of the disclosure.

Embodiments of devices and systems for underside charging of EVs 4 are shown in FIGS. 3-8H and described below. FIG. 3 is a schematic diagram of floor unit 8 for underside charging of EVs 4 in accordance with the disclosure. FIG. 4A is side view of vehicle unit 16 for underside charging of EVs 4 in accordance with the disclosure. FIG. 4B is bottom view of the vehicle unit 16 of FIG. 4A as seen from beneath an underside 120 of EV 4. FIG. 5A is a proximal-to-distal perspective view of a modular system 37 for underside charging of EVs 4 in accordance with the disclosure. FIG. 5B is a distal-to-proximal perspective view of the modular system 37 of FIG. 5A. FIG. 5C is a distal-to-proximal frontal view of the modular system 37 of FIGS. 5A and 5B. FIG. 6 and FIGS. 1B-1D are schematic diagrams of the EV charging environment shown in FIG. 1A. FIGS. 7A-7C illustrate a sequence of positions during a sequence of operational steps of the method of FIG. 2 and the modular system shown in FIGS. 5A-6. FIGS. 8A-8H illustrate a sequence of positions during a sequence of operational steps of the method of FIG. 2 and the modular system shown in FIGS. 5A-7C.

Floor unit 8 includes a frame 39 having a base 40 and an at least partially open top side 42 positioned opposite the base 40. Frame 39 has at least one side wall 44 extending between the base 40 and the top side 42. The base 40, the at least one side wall 44, and the top side 42 define a hollow frame cavity 48 having an opening 46 in the top side 42. Floor unit 8 includes a first 50 and a second 52 pivot rotatably coupled to a first 54 and a second 56 pivot anchor, respectively. The first pivot anchor 54 is positioned and spaced generally longitudinally in the frame cavity 48 proximally from the second pivot anchor 56. Floor unit 8 includes a linear slide guide 58 positioned in the frame cavity 48 and a linear slide 60 slidingly engaged with the linear slide guide 58. The linear slide 60 is positioned generally longitudinally in the frame cavity 48 distally from the second pivot anchor 56.

Floor unit 8 includes a tri-pivot knuckle 62 having three pivot joints (64, 66, 68) rotatably coupled and spaced around a perimeter of tri-pivot knuckle 62. A first 64 of the three pivot joints (64, 66, 68) is rotatably coupled to the linear slide 60. Floor unit 8 includes an actuating link 70 coupled to a second pivot joint 66 of the three pivot joints (64, 66, 68). Floor unit 8 includes an actuator 72 coupled to and between the first pivot anchor 54 and the actuating link 70. The actuator 72 shown in FIG. 3 is a linear actuator 72 configured to alternately move the actuating link 70 generally distally and generally proximally.

Floor unit 8 includes a proximal link 74 coupled to a third pivot joint 68 of the three pivot joints (64, 66, 68). Floor unit 8 includes a compliance unit 76 coupled to and between the second pivot anchor 56 and the proximal link 74. The compliance unit 76 shown in FIG. 3 is a linear compliance unit 76 configured to exert a generally distally-directed force 102 (e.g., a force having a force vector in the proximal (+x) direction) upon the proximal link 74. In one exemplary embodiment, the compliance unit 76 includes a linear spring, gas cylinder or the like. Floor unit 8 includes a distal link 78 coupled to the tri-pivot knuckle 62 and extending generally distally therefrom. Floor unit 8 includes a floor unit electrical connector 34 coupled to a distal end 82 of the distal link 78. Referring to FIG. 1A, floor unit electrical connector 34 is operably coupled to an electric power supply to selectively enable flow of either direct (DC) or alternating (AC) electric current at a specified voltage to the vehicle unit electrical connector 38.

In the example shown in FIG. 3, the first 54 and second 56 pivot anchors are indirectly coupled to frame 39 by way of being coupled to the linear slide guide 58 on a surface thereof facing the top side 42 of frame 39. Also, as shown in FIG. 3, floor unit 8 further includes a third pivot 84 rotatably coupled to a third pivot anchor 86. The third pivot anchor 86 is positioned in the frame cavity 48 at a proximal end 92 of the frame 39. A proximal end 96 of the linear slide guide 58 is coupled to the third pivot 84. Floor unit 8 further includes a fourth pivot 88 rotatably coupled to a fourth pivot anchor 90. The fourth pivot anchor 90 is positioned in the frame cavity 48 at a distal end 80 of frame 39. A distal end 94 of the linear slide guide 58 is coupled to the fourth pivot 88. The first 54 and second 56 pivot anchors are thus indirectly coupled to frame 39 by way of their being coupled to linear slide guide 58, which is rotatably coupled to frame 39 by way of third (84, 86) and fourth (88, 90) pivots and pivot anchors. The rotation of linear slide guide 58 provides rolling (e.g., rocking) of the linear slide guide 58 about the longitudinal (e.g., along the x-axis, as shown in FIG. 3) in response to applied torque, thereby providing multiple degrees of freedom of passive and/or actuated movement during operation of floor unit 8, as further shown and described below.

In some embodiments, not shown, the floor unit 8 further includes a cover 99 movably engaged with at least a portion of the frame 39 of floor unit 8. In these examples, the cover 99 is configured to at least partially cover the frame cavity 48 of floor unit 8 and thereby at least partially enclose frame cavity 48. Also, in these examples, floor unit 8 further includes a cover actuator 101 configured to alternately move the cover 99 between an open position and a closed position. The open position corresponds to the cover 99 at least partially exposing the frame cavity 48 of floor unit 8 to a space (e.g., EV-to-ground surface space 129) above the ground surface 6. The closed position corresponds to the cover 99 at least partially enclosing the frame cavity 48 of the floor unit 8 from the space above the ground surface 6. The frame cavity 48 of the floor unit 8 is more exposed to the space above the ground surface 6 with the cover 99 in the open position as compared to the cover 99 in the closed position.

Figure 1C:
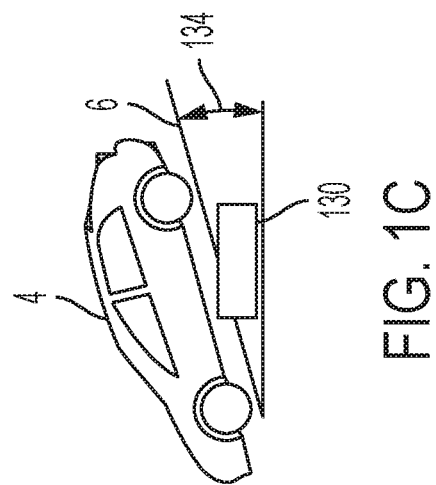
Figure 1B:
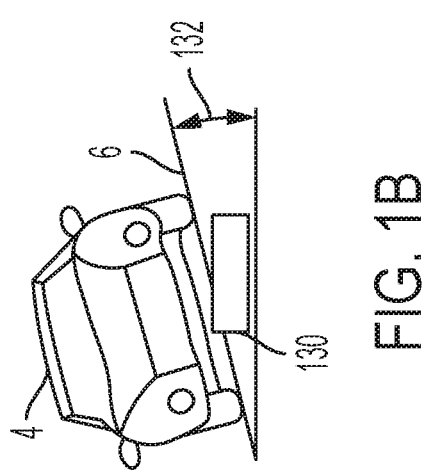
Figure 1D:
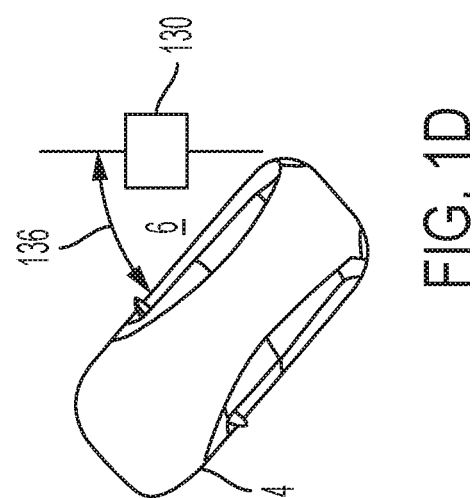

Also, in the example shown in FIG. 3, floor unit 8 includes a fifth pivot 98 rotatably coupled to a fifth pivot anchor 100. The fifth pivot anchor 100 is coupled to the distal end 82 of the distal link 78. The floor unit electrical connector 34 is coupled to the fifth pivot 98. The ability of floor unit electrical connector 34 to pivot about fifth pivot 98 provides pitch (e.g., about the y-axis, as shown in FIG. 3 and FIG. 1C), yaw (e.g., about the z-axis, as shown in FIG. 3 and FIG. 1D), and/or roll (e.g., about the x-axis, as shown in FIG. 3 and FIG. 1B) compliance to floor unit electrical connector 34 during operation, as further shown and described below. The floor unit 8 actuator 72 is further configured to alternately move the actuating link 70 generally proximally and generally distally to alternately move the distal link 78 generally upward and generally downward, respectively, relative to the frame 39. The alternate upward and downward (e.g., along the z-axis, as shown in FIG. 3) actuation of distal link 78, in combination with the aforementioned rocking of linear slide guide 58 and floor unit 8 components coupled thereto, provides multiple degrees of freedom of passive and/or actuated movement during operation of floor unit 8, as further shown and described below.

In the example, the actuator 72 of floor unit 8 is further configured to alternately move the actuating link 70 generally proximally and generally distally to alternately move the floor unit electrical connector 34 generally proximally and generally distally, respectively, relative to the actuator 72, and relative to the first 50 and second 52 pivots to first (50, 54) and second (52, 56) pivots and pivot anchors, which are stationary with respect to frame 39. In consequence thereof, actuator 72 of floor unit 8 also alternately moves floor unit electrical connector 34 generally upward and generally downward, respectively, relative to the stationary frame 39. These alternating movements effected by actuator 72, torque-induced rolling of linear slide guide 58, and torque(s) upon fifth pivot 98 thereby multiple degrees of freedom of passive and/or actuated movement during operation of floor unit 8, as further shown and described below.

Also, in the example shown in FIG. 3, the compliance unit 76 of floor unit 8 is further configured to exert the generally distally-directed force 102 upon proximal link 74 to resist a generally proximally-directed force 104 (e.g., a force having a force vector in the proximal (−x) direction) exerted upon proximal link 74 via a force transmission through tri-pivot knuckle 62. In operation, the force 104 proximally exerted upon compliance unit 76 via tri-pivot knuckle 62 is a result of a generally proximal acceleration of linear slide 60. In the example, compliance unit 76 is further configured to exert the generally distally-directed force 102 upon proximal link 74 to resist a generally proximally-directed force 108 exerted via a force transmission through tri-pivot knuckle 62 upon proximal link 74. In operation, the force 108 distally exerted upon compliance unit 76 via tri-pivot knuckle 62 is a result of a generally proximal acceleration of actuating link 70 (e.g., as a result of its actuation in the proximal direction by actuator 72). Compliance unit 76 thereby provides dynamic stability during operation of floor unit 8, as further shown and described below.

Vehicle unit 16 is positioned on the EV underside 120. Vehicle unit 16 includes a frame 122 having a base 124 and an at least partially open cover side 126 positioned opposite the base 124. The frame 122 has at least one side wall 128 extending between the base 124 and the cover side 126. The base 124, the at least one side wall 128, and the cover side 126 define a hollow frame cavity 116 having an opening 114 in the cover side 126. Vehicle unit 16 includes a frame housing 113 positioned adjacent the frame cavity 122. Frame cavity 116 is also referred to herein as an interior of vehicle unit 16 frame 122.

Figure 4B:
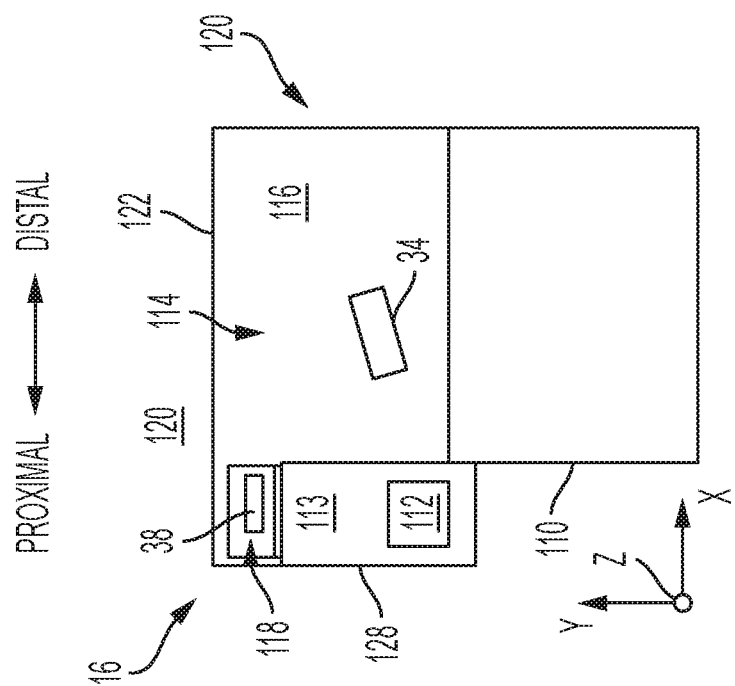
FIG. 4B is bottom view of the vehicle unit shown in FIG. 4A as seen from beneath an underside of EV.
Figure 4A:
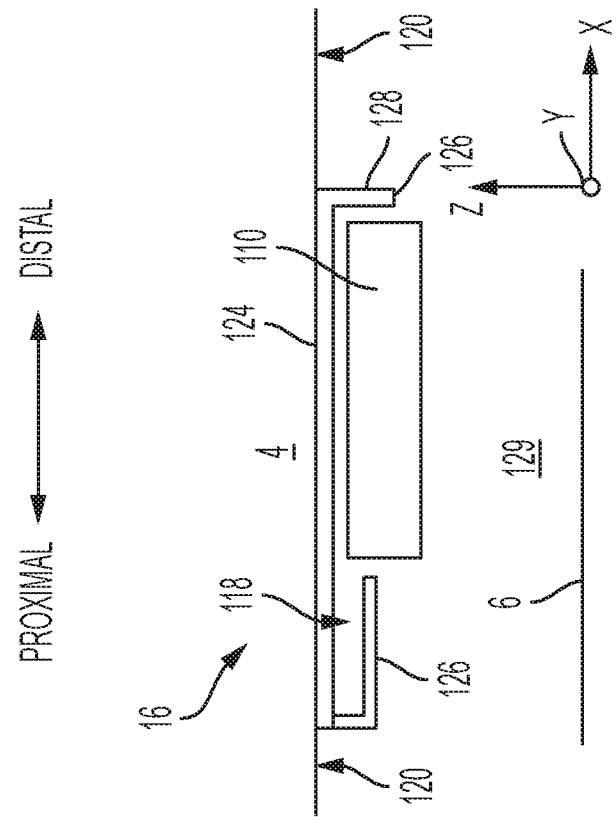
FIG. 4A is side view of a vehicle unit for underside charging of EVs according to an embodiment of the disclosure.

Vehicle unit 16 includes a door 110 slidingly engaged with at least a portion of at least one of: cover side 126 and the at least one side wall 128. Door 110 is configured to at least partially cover opening 114 and thereby at least partially enclose frame cavity 116. Vehicle unit 16 includes a door actuator 112 positioned in the frame housing 113. Door actuator 112 is configured to alternately move the door 110 laterally (e.g., along the x-axis, as shown in FIGS. 4A and 4B) between a first position and a second position. The first position of door 110 (shown in FIG. 4B) corresponds to door 110 at least partially exposing frame cavity 116 to an EV-to-ground surface space 129 between EV 4 and ground surface 6. The second position of door 110 corresponds to door 110 at least partially enclosing frame cavity 116 from EV-to-ground surface space 129. The frame cavity 116 is more exposed to the EV-to-ground surface space 129 with door 110 in the first position as compared to door 110 in the second position.

Vehicle unit 16 includes a charge receptacle 118 positioned adjacent the frame cavity 116. The charge receptacle 118 defines a charge cavity 135 having an open end facing frame cavity 116. Vehicle unit 16 includes a vehicle unit electrical connector 38 positioned in the charge cavity 135. In operation, vehicle unit electrical connector 38 is configured to couple to the floor unit electrical connector 34 when the door 110 is or is near the second position to thereby enable a flow of electric current between floor unit electrical connector 34 and vehicle unit electrical connector 38. Referring again to FIG. 1A, with floor unit 8 and vehicle unit 16 operated as modular system 37 for charging of EVs 4 in EV charging environment 2, coupling of floor unit 34 and vehicle unit 38 electrical connectors enables the selective flow of electrical current from a power supply such as the utility grid to the battery 18 of EV 4 for charging thereof.

Figure 5A:
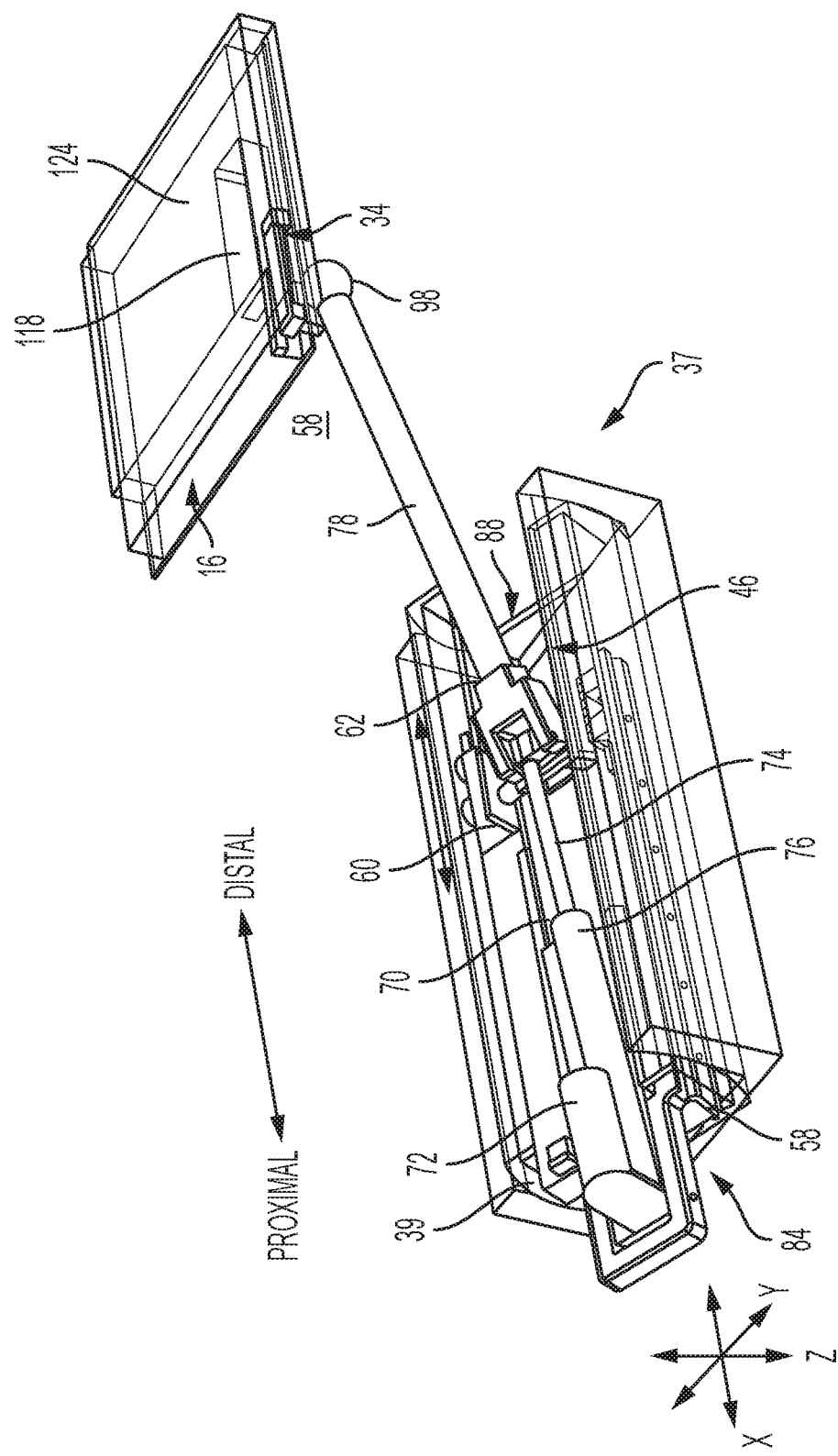
FIG. 5A is a proximal-to-distal perspective view of a modular system for underside charging of EVs according to an embodiment of the disclosure.
Figure 5C:
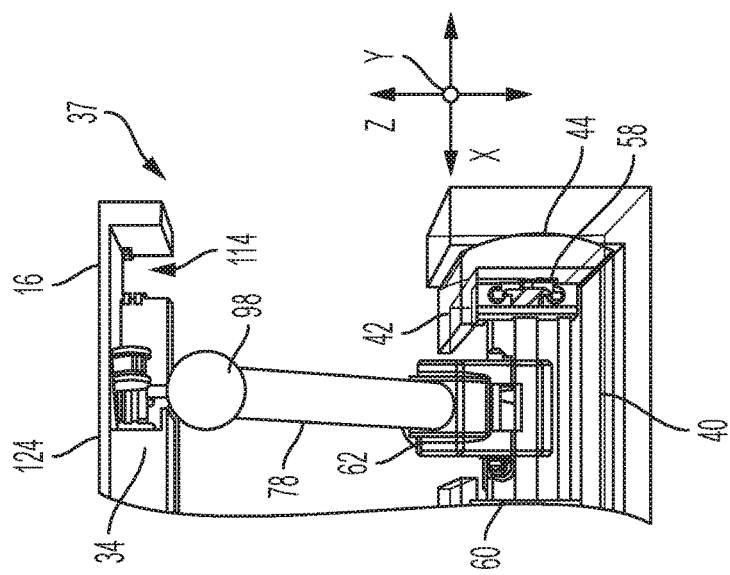
FIG. 5C is a distal-to-proximal frontal view of the modular system shown in FIGS. 5A and 5B.
Figure 5B:
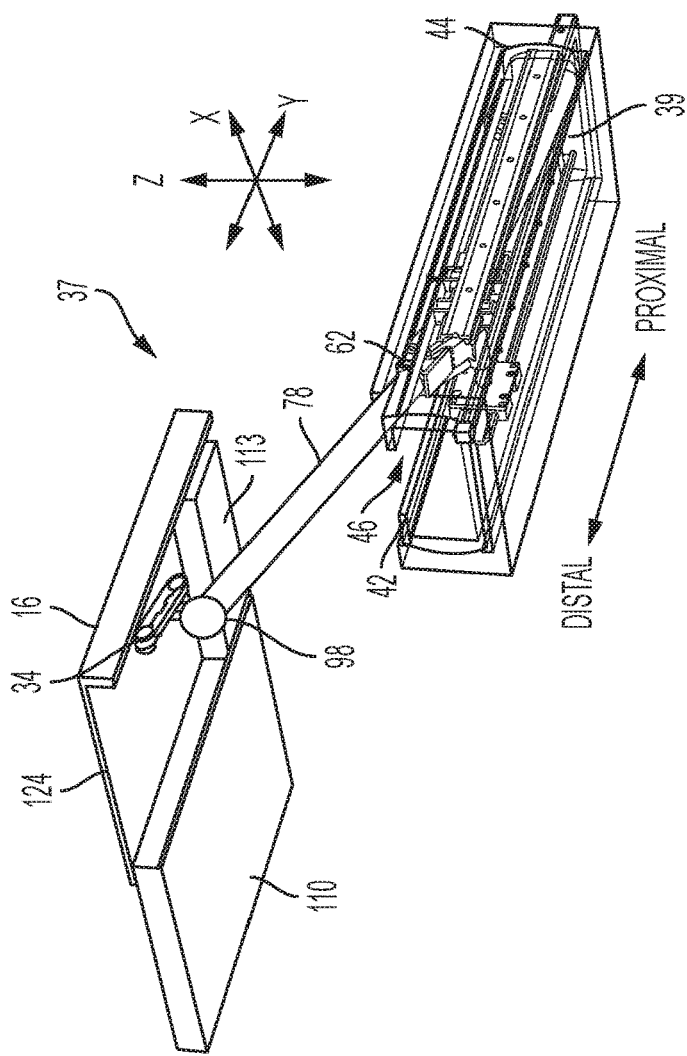
FIG. 5B is a distal-to-proximal perspective view of the modular system shown in FIG. 5A.
Figure 6:
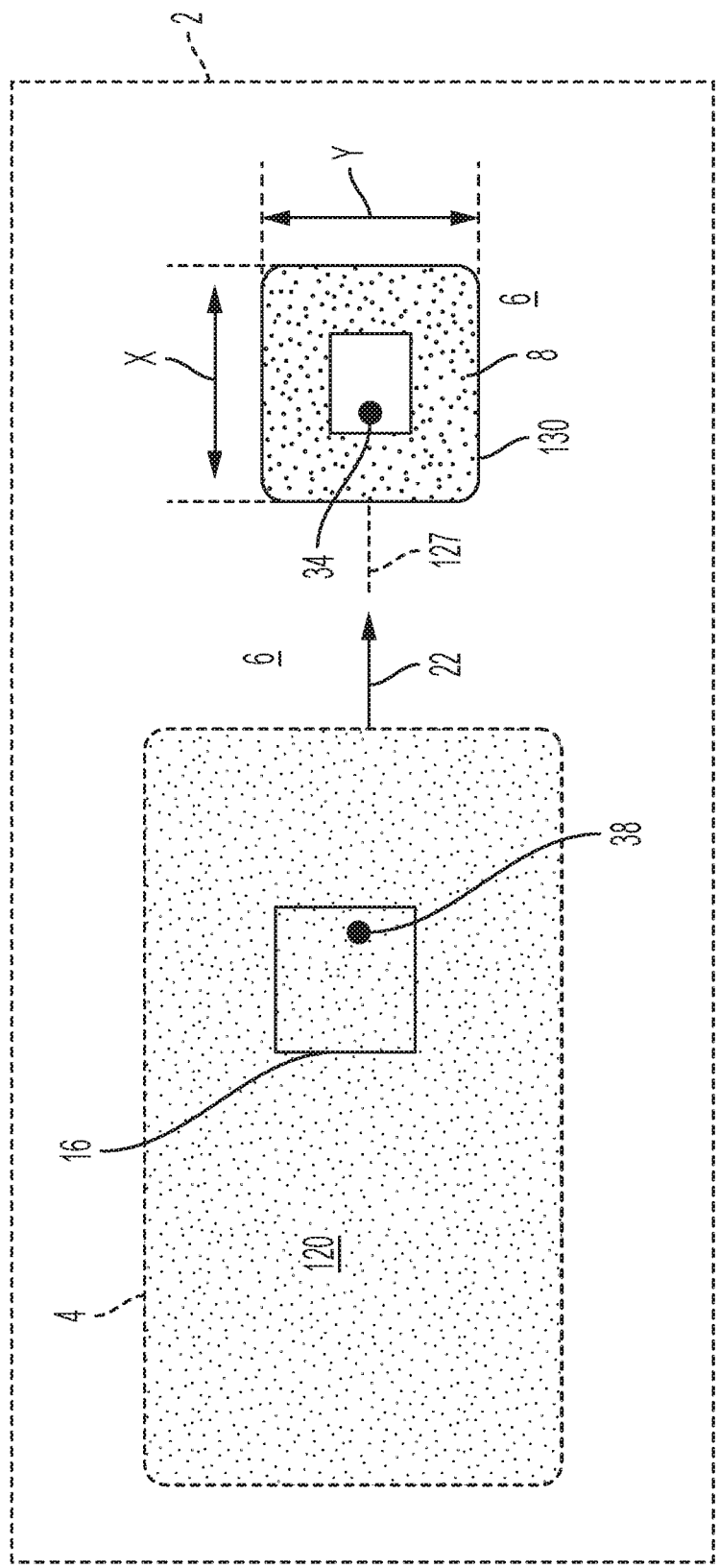
FIG. 6 is a schematic diagram of the EV charging environment shown in FIG. 1A.
Figure 7C:
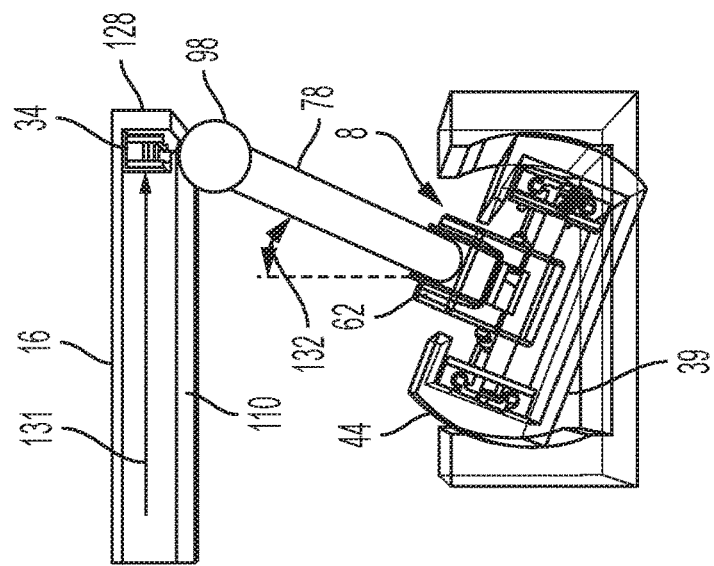
FIGS. 7A-7C illustrate a sequence of positions during a sequence of operational steps of the method of FIG. 2 and the modular system shown in FIGS. 5A-6.
Figure 7B:
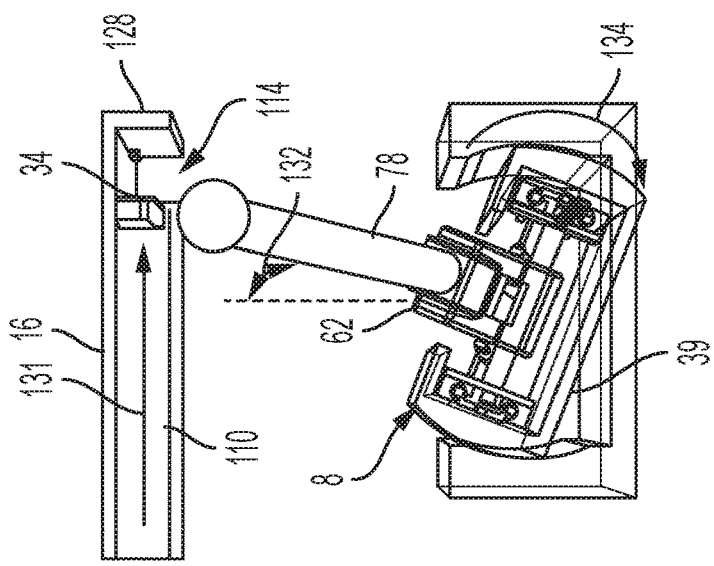
Figure 7A:
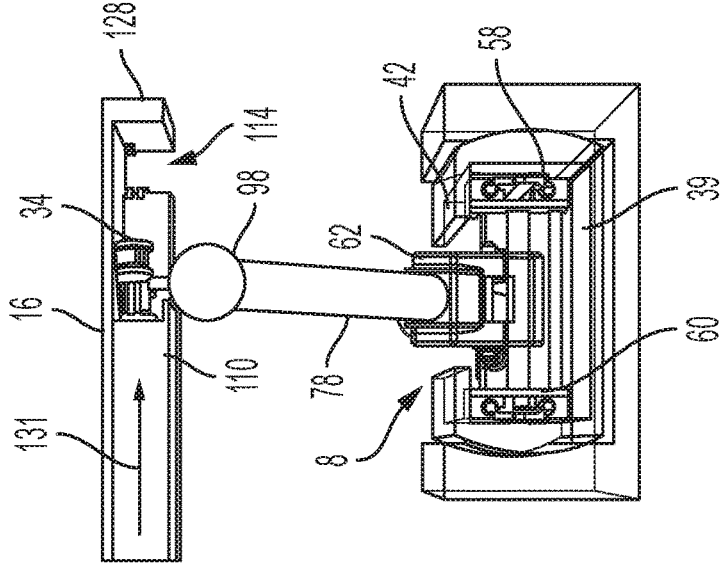
Figure 8B:
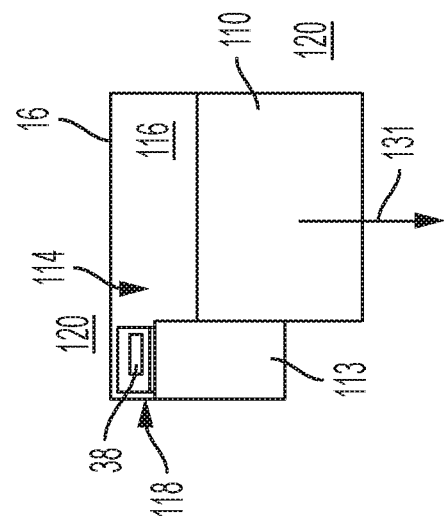
FIGS. 8A-8H illustrate a sequence of positions during a sequence of operational steps of the method of FIG. 2 and the modular system shown in FIGS. 5A-7C.
Figure 8A:
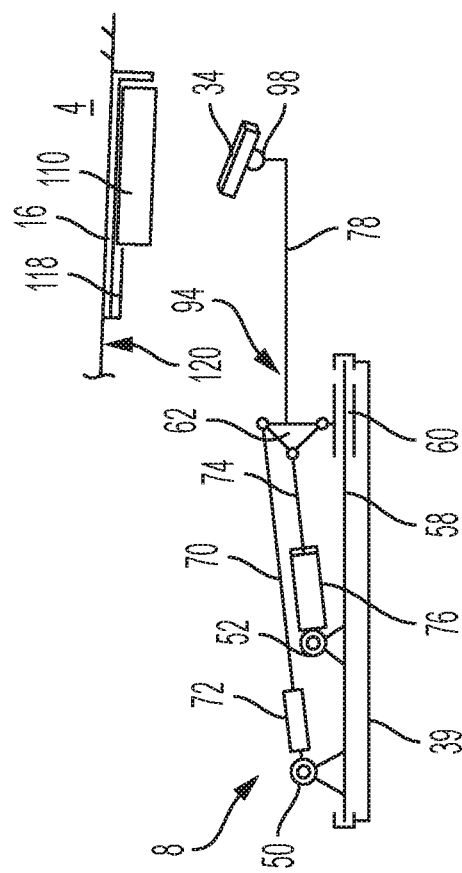
Figure 8D:
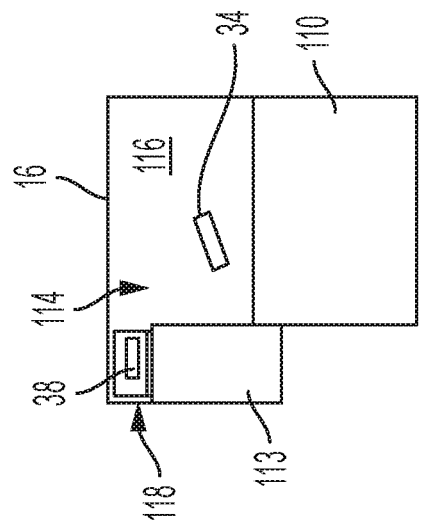
Figure 8C:
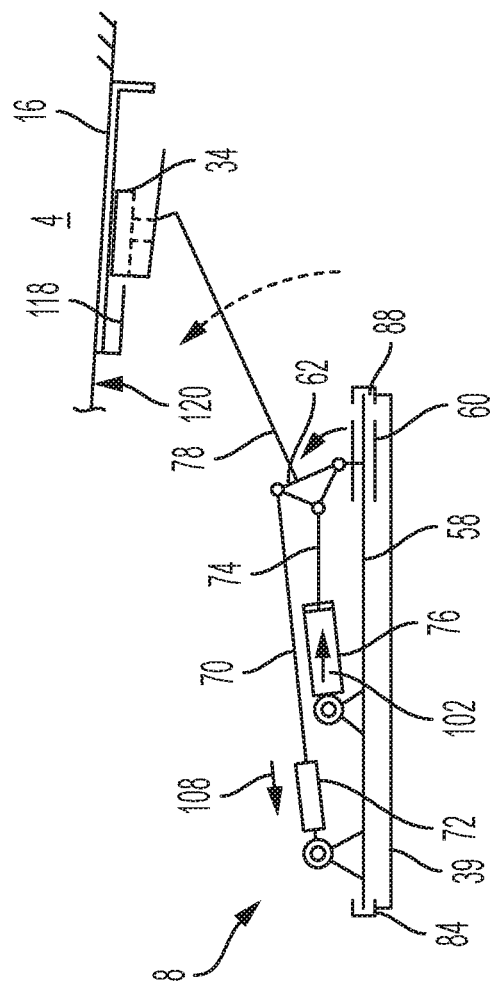
Figure 8F:
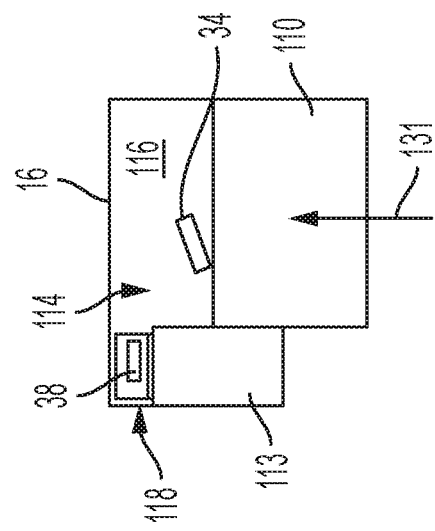
Figure 8E:
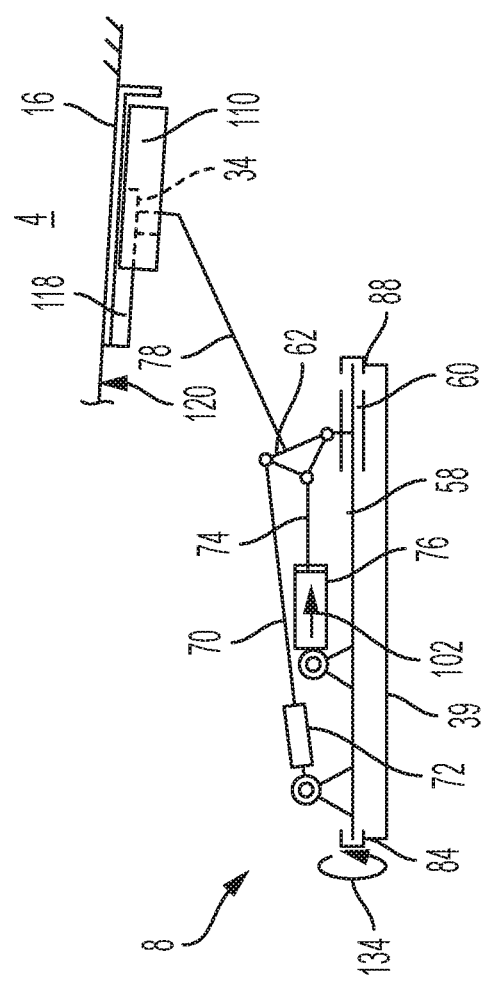
Figure 8H:
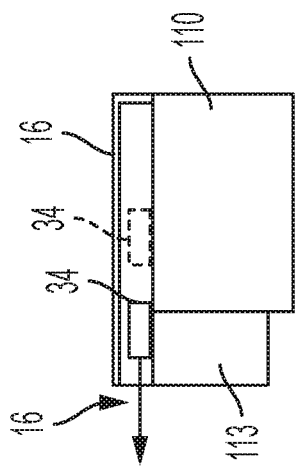
Figure 8G:
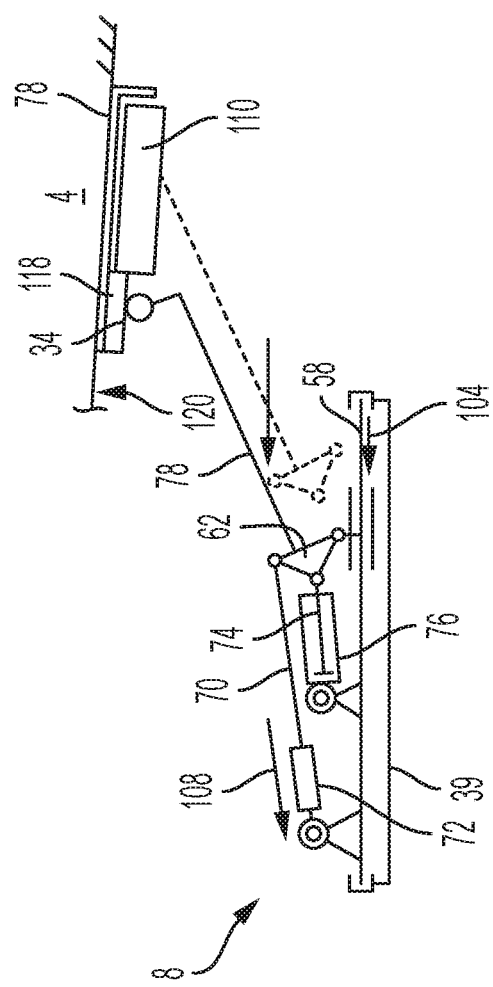

Referring now to FIGS. 5A-8H, the modular system 37 for charging EVs 4 includes floor unit 8 and vehicle unit 16. System 37 operates in EV charging environment 2, with vehicle unit 16 positioned above floor unit 8. Prior to or during when EV 4 is positioned in environment 2, door 110 is moved by door actuator 112 to the first position from the second position. In operation, actuator 72 is further configured move the actuating link 70 generally proximally to move floor unit electrical connector 34 upward (e.g., in the +z direction, as shown in FIGS. 5A-5C) from the frame 39. In moving upward, the floor unit electrical connector 34 enters the frame cavity 116 of vehicle unit 16 to be positioned therein.

In operation, door actuator 112 is further configured to move door 110 laterally (e.g., along the y-axis, as shown in FIGS. 4A and 4B) from the first position to or near the second position. The lateral movement of door 110 by door actuator 112 thereby moves the floor unit electrical connector 34 positioned in the vehicle unit 16 frame cavity 116 generally laterally toward the vehicle unit electrical connector 38. In the example, compliance unit 76 is further configured to exert the generally distally-directed force 102 upon the proximal link 74 to maintain linear slide 60 in a first stationary position while actuating link 70 is moved upward by the actuator 72 and while floor unit electrical connector 34 is moved laterally by the door 110.

The lateral movement of floor unit electrical connector 34 positioned in frame cavity 116 of vehicle unit 16 is facilitated by a concurrent rolling of linear slide guide 58 about the third 84 and fourth 88 pivots in response to a torque thereupon by the door 110. The concurrent rolling of linear slide guide 58 further facilitates accommodation of EV 4 and vehicle unit 16 positioned above floor unit 8 in environment 2 at varying angles and orientations with respect to a longitudinal centerline 127 of floor unit 8, as shown in FIGS. 6 and 1B-1D.

As positioned in frame cavity 116 of vehicle unit 16, floor unit electrical connector 34 makes a flush contact with the base 124 of frame 122 of vehicle unit 16. The flush contact between floor unit electrical connector 34 and base 124 is facilitated by at least one of: a yawing, a pitching, and a rolling, of the floor unit electrical connector 34 about fifth pivot 98. The concurrent rolling of linear slide guide 58 further facilitates accommodation of EV 4 and vehicle unit 16 positioned above floor unit 8 in environment 4 at varying angles and orientations with respect to longitudinal centerline 127 of floor unit 8, as shown in FIGS. 6 and 1B-1D.

With the floor unit electrical connector 34 positioned in frame cavity 116 of vehicle unit 16 and with door 110 in or near the second position, actuator 70 of floor unit 8 is further configured to move actuating link 70 generally proximally to thereby move floor unit electrical connector 34 generally proximally toward the vehicle unit electrical connector 38 for coupling therebetween. In operation, compliance unit 76 is further configured to allow a generally proximal acceleration of linear slide 60 to a second stationary position while actuating link 70 and floor unit electrical connector 34 are moved generally proximally by actuator 72. The second stationary position is located proximal along the linear slide guide 58 relative to the first stationary position.

After EV 4 is charged, or upon EV 4 needing to depart EV charging environment 2 for any other reason, the above described devices and systems are employed to decouple the vehicle unit 38 and floor unit 34 electrical connectors. The actuating link 70 and floor unit electrical connector 34 is moved downward back into the frame cavity 48 of frame 39 and, in some embodiments, a floor unit 8 cover is closed to enclosed frame cavity 48 from being exposed to ground surface 6. During or after retraction of actuating link 70 and floor unit electrical connector 34 back into frame cavity 48 of frame 39, door actuator 112 moves the door 110 of vehicle unit 16 to the second (e.g., fully closed) position to entirely enclose cavity 116 of vehicle unit 16 from EV-to-ground surface space 129.

Various embodiments disclosed herein are to be taken in the illustrative and explanatory sense, and should in no way be construed as limiting of the present disclosure.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof

What is claimed is:

1. A floor unit device for charging of an electric vehicle, the device comprising:
   a frame;
   a first pivot and a second pivot positioned in the frame, wherein the first pivot is positioned in the frame proximally from the second pivot;
   a linear slide slidingly engaged with the frame and disposed in the frame distally from the second pivot;
   a tri-pivot knuckle having a distal link extending therefrom and three pivot joints rotatably coupled thereto, wherein a first of the three pivot joints is coupled to the linear slide;
   an actuating link coupled between the first pivot and a second of the three pivot joints, the actuating link including an actuator configured to alternately move the actuating link generally distally and generally proximally;
   a proximal link coupled to the second pivot and a third of the three pivot joints, the proximal link including a compliance unit configured to exert a generally distally-directed force upon the proximal link; and
   a floor unit electrical connector coupled to a distal end of the distal link.

2. The device of claim 1, wherein the first and second pivots are rotatably coupled to the frame.

3. The device of claim 1, further comprising:
   a third pivot positioned in the frame at a proximal end thereof, wherein a proximal end of a linear slide guide onto which the linear slide is engaged is rotatably coupled to the third pivot; and
   a fourth pivot positioned in the frame at a distal end thereof, wherein a distal end of the linear slide guide is rotatably coupled to the fourth pivot.

4. The device of claim 1, further comprising a fifth pivot rotatably coupled to a distal end of the distal link, wherein the floor unit electrical connector is coupled to the fifth pivot.

5. The device of claim 1, wherein the actuator is further configured to alternately move the actuating link generally proximally and generally distally to alternately move the distal link generally upward and generally downward, respectively, relative to the frame.

6. The device of claim 1, wherein the compliance unit is further configured to exert the generally distally-directed force upon the proximal link to resist a generally proximally-directed force exerted via a force transmission through the tri-pivot knuckle upon the proximal link by a generally proximal acceleration of the linear slide.

7. The device of claim 1, wherein the compliance unit is further configured to exert the generally distally-directed force upon the proximal link to resist a generally proximally-directed force exerted via a force transmission through the tri-pivot knuckle upon the proximal link by a generally proximal acceleration of the actuating link.

8. A system for charging of an electric vehicle (EV) in an EV charging environment having a ground surface, the EV having an EV underside positioned opposite the ground surface, the system comprising:
   a floor unit device positioned on or at least partially in the ground surface, the floor unit device comprising a floor unit electrical connector; and
   a vehicle unit device positioned on or at least partially in the EV underside, the vehicle unit device comprising:
   a frame;
   a door slidingly engaged with at least a portion of the frame, wherein the frame has an opening in at least one side thereof, and wherein the door is configured to at least partially selectively cover the opening to thereby at least partially enclose the frame under action of a door actuator;
   a charge receptacle positioned in the frame within a charge cavity defined in the frame; and
   a vehicle unit electrical connector positioned in the charge cavity.

9. The system of claim 8, wherein the floor unit device comprises:
   a frame;
   a first pivot and a second pivot positioned in the frame, wherein the first pivot is positioned in the frame proximally from the second pivot;
   a linear slide slidingly engaged with the frame and disposed in the frame distally from the second pivot;
   a tri-pivot knuckle having a distal link extending therefrom and three pivot joints rotatably coupled thereto, wherein a first of the three pivot joints is coupled to the linear slide;
   an actuating link coupled between the first pivot and a second of the three pivot joints, the actuating link including an actuator configured to alternately move the actuating link generally distally and generally proximally;
   a proximal link coupled to the second pivot and a third of the three pivot joints, the proximal link including a compliance unit configured to exert a generally distally-directed force upon the proximal link; and
   a floor unit electrical connector coupled to a distal end of the distal link.

10. The system of claim 9, wherein, in a condition when the vehicle unit is positioned above the floor unit and the door in an open position, a contraction of the actuator moves the actuating link and the floor unit electrical connector upward from the floor unit frame and towards the charge cavity.

11. The system of claim 10, wherein the door operates to push the floor unit electrical connector laterally towards the charge cavity.

12. The system of claim 11, wherein, while the actuating link is being moved upward by the actuator and while the floor unit electrical connector is being moved laterally by the door, the compliance unit is further configured to exert a force to maintain the linear slide in a first position.

13. The system of claim 11, wherein:
   the floor unit further comprises a linear slide guide onto which the linear slide is slidably disposed;
   a third pivot positioned in the frame at a proximal end thereof, wherein a proximal end of the linear slide guide is rotatably coupled to the third pivot; and
   a fourth pivot positioned in the frame at a distal end thereof, wherein a distal end of the linear slide guide is rotatably coupled to the fourth pivot,
   wherein the lateral movement of the floor unit electrical connector positioned in the interior of the frame of the vehicle unit is facilitated by a concurrent rolling of the linear slide guide about the third and fourth pivots.

14. The system of claim 13, wherein the concurrent rolling of the linear slide guide further facilitates accommodation of the vehicle unit positioned above the floor unit at varying angles and orientations with respect to a longitudinal centerline of the floor unit.

15. The system of claim 11, wherein the floor unit further comprises:
   a fifth pivot rotatably coupled to the distal end of the distal link, wherein the floor unit electrical connector is coupled to the fifth pivot,
   wherein, as positioned in the frame of the vehicle unit, the floor unit electrical connector flushly contacts the base of the frame of the vehicle unit, and wherein the flush contact is facilitated by at least one of: a yawing, a pitching, and a rolling, of the floor unit electrical connector about the fifth pivot.

16. The system of claim 15, wherein the concurrent rolling of the linear slide guide further facilitates accommodation of the vehicle unit positioned above the floor unit at varying angles and orientations with respect to a longitudinal centerline of the floor unit.

17. The system of claim 11, wherein, with the floor unit electrical connector positioned in the frame of the vehicle unit and with the door in or near the second position, the actuator of the floor unit is further configured to move the actuating link generally proximally to thereby move the floor unit electrical connector generally proximally toward the vehicle unit electrical connector to facilitate the mating engagement therebetween.

18. The system of claim 15, wherein, while the actuating link and the floor unit electrical connector are moved generally proximally by the actuator, the compliance unit is further configured to allow a generally proximal acceleration of the linear slide to a second stationary position located proximally to the first stationary position.

19. The system of claim 9, wherein the frame of the floor unit has an opening in at least one side thereof, and wherein the floor unit further comprises:
   a cover movably engaged with at least a portion of the floor unit frame, the cover configured to at least partially cover the opening of the floor unit frame to thereby at least partially enclose the floor unit frame; and
   a cover actuator configured to alternately move the floor unit cover between an open position and a closed position, wherein the open position corresponds to the cover at least partially exposing the opening of the floor unit frame to a space above the ground surface, wherein the closed position corresponds to the cover at least partially enclosing the floor unit frame from the space above the ground surface, and wherein the floor unit frame is more exposed to the space above the ground surface with the cover in the open position as compared to the cover in the closed position.

* * * * *